United States Patent [19]

Walker

[11] 4,095,987
[45] Jun. 20, 1978

[54] METHOD OF AND COMPOSITION FOR CEMENTING OIL WELLS

[75] Inventor: Thad O. Walker, Houston, Tex.

[73] Assignee: Texaco Inc., New York, N.Y.

[21] Appl. No.: 755,314

[22] Filed: Dec. 29, 1976

[51] Int. Cl.² .............................................. C04B 7/352
[52] U.S. Cl. ...................................... 106/92; 166/293
[58] Field of Search .................... 106/92, 93; 166/293; 252/8.5 A

[56] References Cited

U.S. PATENT DOCUMENTS

| | | | |
|---|---|---|---|
| 3,849,317 | 11/1974 | Walker | 252/8.5 A |
| 3,948,672 | 4/1976 | Harnsberger | 106/93 |
| 3,998,742 | 12/1976 | Walker | 252/8.5 A |

*Primary Examiner*—J. Poer
*Attorney, Agent, or Firm*—Thomas H. Whaley; Carl G. Ries; James F. Young

[57] ABSTRACT

This invention relates to an improved oil well cement composition and a method of use thereof in wells penetrating subterranean formations.

My U.S. Pat. No. 3,849,317, issued Nov. 19, 1974, is directed to the hydrolyzed cereal solids as an additive for the reduction of gel strength and yield point of an aqueous drilling fluid saturated with calcium hydroxide in the liquid phase.

6 Claims, No Drawings

METHOD OF AND COMPOSITION FOR CEMENTING OIL WELLS

BACKGROUND OF THE INVENTION

The invention pertains to an improved cement composition and a method of use thereof in cementing oil wells penetrating subterranean formations. The term "cement" as used herein refers to Portland, aluminous and other types of cements used in oil field cementing operations.

PRIOR ART

Cement compositions are usually employed by making an aqueous slurry thereof and employing the slurry in a confined zone at the place to be cemented, the slurry thereafter setting or hardening into a monolithic solid. Among the extensive uses of cement compositions are cementing of wells, e.g. cementing casing in place and cementing of thief zones and zones producing undesirable fluids such as a water-producing stratum in an oil or gas well.

A problem associated with well-cementing operations has been control of the setting time of the cement component of the slurry. Inability to control the setting time can result in poor compressive strength of the set cement if used too soon or an unacceptable delay if too long a time for setting is required.

Prior attempts have been made to control aqueous hydraulic cement compositions during the setting. These attempts have, in a large number of instances, included incorporating an additive into the cement slurry.

Known oil well cement friction reducing additives include carboxymethylhydroxyethyl cellulose, borax, dehydrated borax, calcium lignosulfonate and ferrochrome lignosulfonate.

DESCRIPTION OF THE PREFERRED EMBODIMENT

The oil well cement additive used in the method and cement composition of the present invention is hydrolyzed cereal solids, a food additive whose carbohydrate composition is as follows:

| | |
|---|---|
| Dextrose | 1% |
| Di-saccharide | 4% |
| Tri-saccharide | 5% |
| Tetra-saccharide | 4% |
| Penta-saccharide | 4% |
| Hexa-saccharide and above | 82% |

The material is available commercially under the tradename MOR-REX ® from CPC International Inc. The material is available in a granular form for use in food products as a nutritive bulk agent. It is typically available with approximately 5% moisture and has a pH of from 4.5 to 5.5.

This oil well cement additive is admixed with the cement component of the composition of the invention in an amount of from about 0.5 to 5% by weight, basis cement, and preferably from about 0.5 to 2% by weight.

The cement component of the composition can be any type of oil well cement such as a hydraulic cement. Hydraulic cement is defined as any cement which will set or cure under the action of water, and is intended to include all mixtures of lime, silica and alumina, or of lime and magnesia, silica and alumina and iron oxide. Hydraulic cements include hydraulic limes, pozzolan cements, natural cements, and portland cements. Pozzolan cements include slag cements made from slaked lime and granulated blast furnace slag. Among these hydraulic cements, the portland cements are preferred, chiefly because of their superior strength characteristics. The term portland cement is intended to include any cement regarded in the cementing art as a portland cement, usually as defined by standard reference works. The precise composition of any one particular portland cement will vary from another, but generally portland cements are produced by mixing and grinding together a calcareous and an argillaceous material, kiln heating the mixture (1350° to 1800° C.) until vitrification begins, pulverizing the clinker thus produced and mixing the same with a small amount of gypsum. The portland cements may be ground to any desired particle size, and grading of portland cements is on the basis of the specific surface of the cement, which will range between 1200 and 2600 square centimeters per gram. Grading is also based on the amount of cement particles retained on a No. 325 screen, U.S. Sieve Series.

A preferred cement component is a light weight portland cement having a density of about 75 pounds per cubic foot and an approximate chemical analysis as follows: silicon dioxide 38.3%, aluminum oxide 13%, ferric oxide 5.2%, calcium oxide 35.7%, magnesium oxide 1.6%, sulfur trioxide 2.4%, loss in weight on ignition about 3.3%.

The amount of water employed to make up the hydraulic cement slurry is not critical and generally the amount of water necessary to give a settable cement composition having the required characteristics will be in an amount of from about 25% to about 60% by weight, based on the weight of the composition. The amount of water employed should be only such as is sufficient to produce a pumpable slurry.

A preferred quantity of water for slurry formation is from about 40 to 55%.

The method of the present invention comprises forming an aqueous slurry of the composition of the invention and pumping said slurry down the well bore under pressure sufficient to force the slurry into and about the area being cemented. After being so placed the formation is shut in for a time period sufficient to permit the cement component to set and form an impervious barrier therein having an adequate compressive strength. Thereafter the well can be equipped for production.

Following is a description by way of example of a method of carrying out the practice of the present invention.

A Class H - Trinity Light Wate Cement having a density of about 75 pounds per cubic foot and a chemical analysis approximately as follows: silicon dioxide 38.3%, aluminum oxide 13%, ferric oxide 5.2%, calcium oxide 35.7%, magnesium oxide 1.6% and sulfur trioxide 2.4%, with a loss on ignition of approximately 3.3%, was selected as the base cement.

Into equal portions of this base cement there were added with mixing sufficient amounts of four commercial cement friction reducing agents to attain a concentration of the cement additive of 0.8% by weight.

Another equal portion of the base cement was blended with an amount of the cement friction reducing additive of the present invention so as to attain a concentration of 0.8% by weight therein.

Thereafter each of the blended samples was diluted with 0.74 parts of water for a slurry.

Tests were conducted on each of the resultant slurries to determine the effectiveness of the cement friction reducers. In addition, a Control Sample was evaluated to provide a basis for comparison. This Control Sample had no cement friction reducer blended therewith. It consisted of 100% cement with .74 parts of water to form a slurry. The rheological properties of the slurries are summarized in the table below. The tests were conducted at slurry temperatures of 40.6° c. (115° F.)

TABLE

| EXAMPLE NO. | SLURRY COMPOSITION | CONC. OF ADDITIVE (WT. %) | FANN READING (RPM) | | | |
|---|---|---|---|---|---|---|
| | | | 600 | 300 | 200 | 100 |
| Control Example | Cement | — | 78 | 70 | 67 | 62 |
| Comparative Ex A | " | 0.8% of A$^{(1)}$ | 47 | 41 | 38 | 33 |
| Comparative Ex B | " | 0.8% of B$^{(2)}$ | 53 | 46 | 43 | 39 |
| Comparative Ex C | " | 0.8% of C$^{(3)}$ | 53 | 47 | 44 | 39 |
| Comparative Ex D | " | 0.8% of D$^{(4)}$ | 62 | 56 | 52 | 48 |
| Example 1 | | 0.8% of X$^{(5)}$ | 26 | 17 | 15 | 11 |

$^{(1-4)}$Four commercial Friction Reducing Additives
$X^{(5)}$Mor-Rex 1918

The data in the above Table show that the friction reducing additive of the present invention, Mor-Rex 1918, (Ex. 1) is superior to any of the four commercial friction reducing additives, as evidenced by the substantial reduction in viscosity readings obtained therewith (Example 1 versus Comparative Ex. A-D inclusive).

Obviously, many modifications and variations of the invention as hereinbefore set forth may be made without departing from the spirit and scope thereof and therefore only such limitations should be imposed as are indicated in the appended claims.

I claim:

1. A method of cementing a zone in an oil well penetrating a subterranean formation comprising injecting down the well and positioning in the zone to be cemented a hydraulic cement aqueous slurry composition comprising dry hydraulic cement, and from about 0.05 to about 5.0 percent by weight, based on dry hydraulic cement of a cement friction reducing additive consisting of hydrolyzed cereal solids which is comprised of hydrolyzed cereal solids which is comprised of from about 15% to about 25% by weight di-saccharides, tri-saccharides, tetra-saccharides, and penta-saccharides, and from about 75 to about 85% by weight hexa-saccharides and above, and sufficient water to form a pumpable slurry, and allowing the cement thus positioned to set to a monolithic mass.

2. Method as claimed in claim 1 wherein the concentration of said additive is from about 0.5 to about 2%.

3. Method as claimed in claim 1 wherein the concentration of said additive is about 1%.

4. A cement composition consisting essentially of cement and from about 0.05 to about 5% by weight, basis cement, of a cement friction reducing additive consisting of hydrolyzed cereal solids which is comprised of from about 15% to about 25% by weight di-saccharides, tri-saccharides, tetra-saccharides, and penta-saccharides, and from about 75 to about 85% by weight hexa-saccharides and above.

5. Composition as claimed in claim 4 wherein the concentration of said additive is from about 0.5 to about 2%.

6. Composition as claimed in claim 4 wherein the concentration of said additive is about 1%.

* * * * *